United States Patent

[11] 3,542,012

| [72] | Inventors | Christian Frieberger<br>Vegagasse 15, 1190;<br>Heinrich Malczynski, Knauergasse 1-3,<br>1100, Vienna, Austria |
|---|---|---|
| [21] | Appl. No. | 650,060 |
| [22] | Filed | June 29, 1967 |
| [45] | Patented | Nov. 24, 1970 |
| [32] | Priority | June 30, 1966 |
| [33] | | Austria |
| [31] | | No. 6247/66 |

[54] SYSTEM FOR RECORDING RECURRING EVENTS
9 Claims, 5 Drawing Figs.

[52] U.S. Cl. ................................................ 128/2.05,
346/33, 346/44
[51] Int. Cl. ................................................ A61b 5/02,
G01d 9/00, G01d 9/08
[50] Field of Search.................................................. 346/1,
33, 34, 78, 79, 94, 50, 44(Consulted); 128/2.05,
2.06(Consulted); 235/(Consulted); 197/1,
19(Consulted); 101/(Consulted); 272/57; 73/379

[56] References Cited
UNITED STATES PATENTS

| 2,686,100 | 8/1954 | Eckert et al. | 346/33 |
| 2,818,321 | 12/1957 | Searles | 346/34 |
| 2,906,583 | 9/1959 | Degen | 346/94 |
| 2,968,793 | 1/1961 | Bellamy | 346/34X |

*Primary Examiner*—Anton O. Oechsle
*Attorney*—Karl F. Ross

ABSTRACT: To record the number of occurrences of a recurring event, such as a pulsebeat, as well as its cadence relative to a more slowly recurring reference signal, which may be the output of a timer or an indication of some other more or less periodic occurrence (such as the downtread of a pedaling cyclist), a character key of a typewriter is depressed to print a mark upon occurence of the event whereas a line-feed and carriage-return mechanism is actuated in response to the reference signal so that the number of events per measuring cycle—or, if desired, the number of recurrences per cycle exceeding a predetermined minimum—can be read directly on an individual line of the typewriter sheet. Electric pulses registering the recurring event and the pacemaker signal may also be stored on a recording medium, such as a magnetic tape, for later transmission to the control circuit of an electric typewriter operating in the aforedescribed manner.

Patented Nov. 24, 1970
3,542,012
Sheet 1 of 4
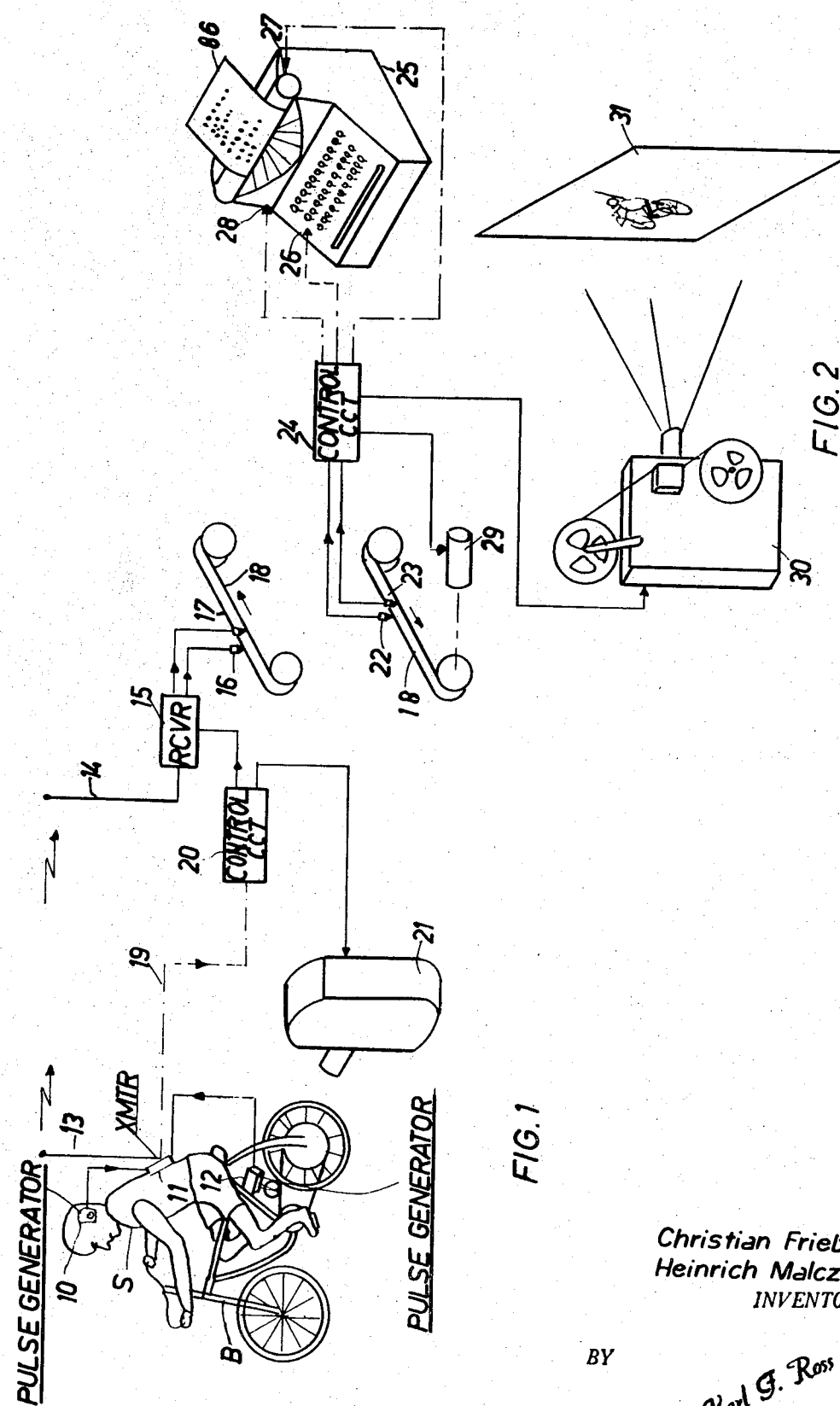
Christian Frieberger
Heinrich Malczynski
INVENTORS.
BY
Karl G. Ross
Attorney

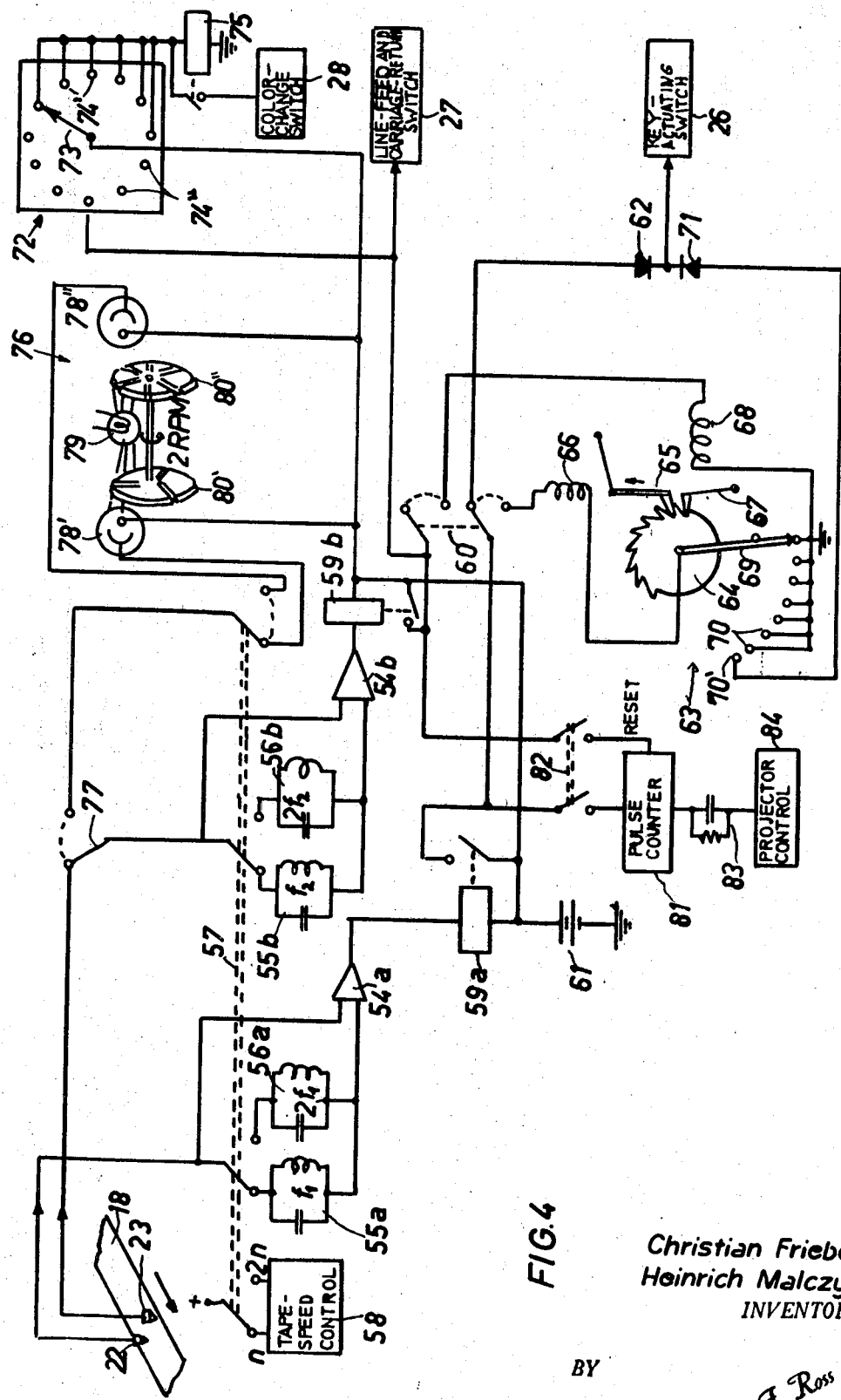

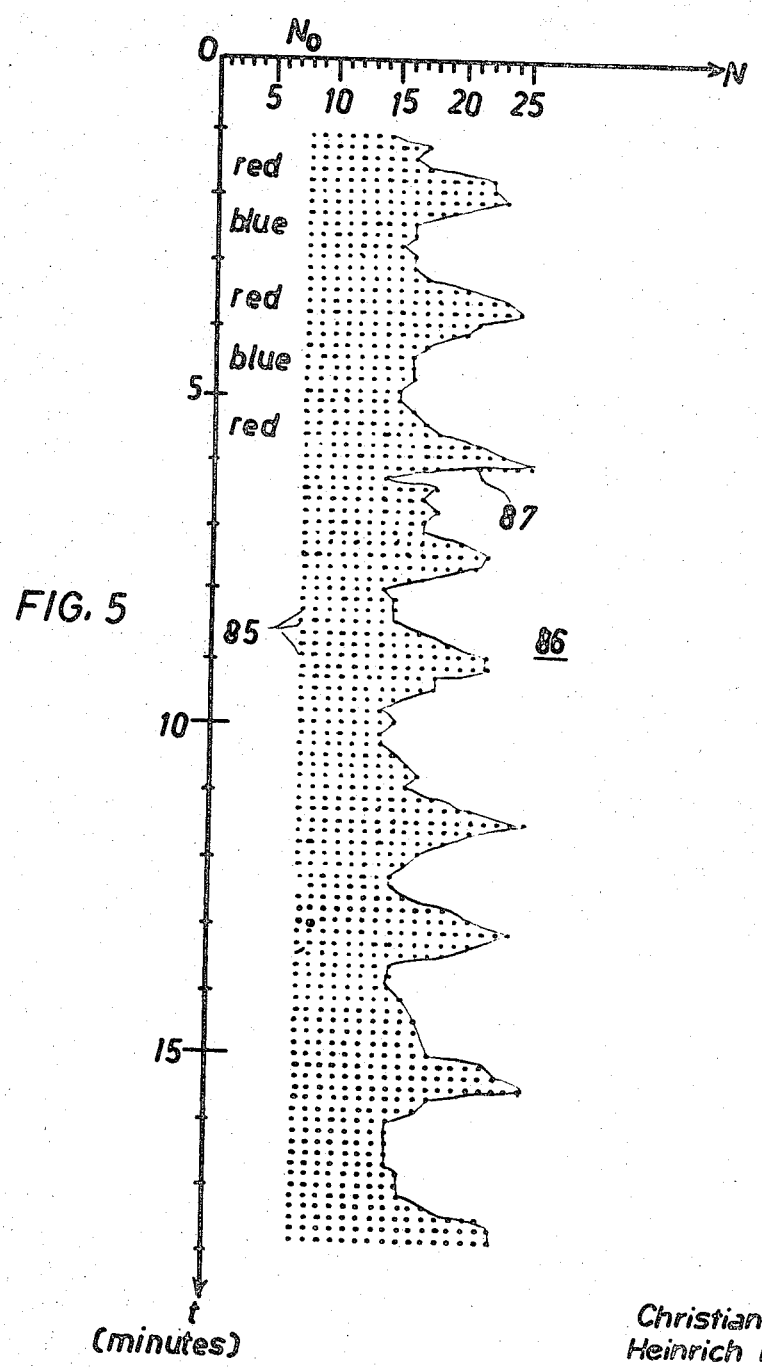
Christian Frieberger
Heinrich Malczynski
INVENTORS.

SYSTEM FOR RECORDING RECURRING EVENTS
SPECIFICATION

My present invention relates to a system for recording the number of occurrences of a recurrent event, e.g. a pulsebeat, as well as its cadence relative to a train of timing pulses or some other reference signal whose recurrence rate is substantially less than that of the event to be recorded.

An object of this invention is to provide means for the charting of the cadence (i.e. rate of recurrence) of such event during consecutive measuring periods, as determined by the reference signal, as well as the number of such occurrences per measuring period, in a simple and effective manner with the aid of a commonly available piece of equipment, i.e. a typewriter.

Another object of this invention is to allow for the charting of the occurrences of the event, in the aforestated manner, long after the actual happening thereof, advantageously in conjunction with a visual reproduction of the circumstances surrounding the event, such as the activities of a person whose pulse is to be thus recorded.

It is also an object of this invention to provide means for enabling such recording and charting to be carried out at varying distances from the locus of the event, thereby giving full freedom of motion to a person or other subject whose reactions, pulsebeat or the like are to be measured.

The foregoing objects are realized, pursuant to my present invention, by the actuation of a character key of a conventional typewriter, advantageously an electric one, upon each occurrence of the event to be measured beyond a predetermined number (which may be zero) of such occurrences in any interval between successive reference signals and operating, in the rhythm of these reference signals, the line-feed and carriage-return mechanism of the typewriter whereby a varying number of characters (e.g. dots) will appear on successive lines of a paper, stencil sheet or the like inserted into the typewriter. In the simplest case, the number of characters per line will represent the number of occurrences of the event per measuring interval; in many instances, however, that number will always equal or exceed a predetermined minimum so that this background count may be omitted from the sheet, without altering the essential character of the resulting chart, by suppressing the same finite number of key-actuating pulses during each interval and producing the marks on the sheet only in response to super numerary pulses per interval.

The aforedescribed actuation of a typewriter may be brought about directly and automatically by respectively connecting the sources of event-responsive pulses and reference signals to the switches which control a selected typewriter key and the line feed. It is, however, also possible and frequently advantageous to store these event-responsive pulses, possibly together with the accompanying reference signals, on a magnetic tape or other recording medium and to reproduce them thereafter, at a convenient time and place, for evaluation by means of an associated typewriter. This procedure enables the charting of the event at an increased speed, e.g. at two or three times the original rate of recurrence. It is also possible to make a visual record of the event, or certain phases thereof, and to reproduce it together with the playback of the recording medium. Thus, I may connect a motion picture camera to a control circuit therefore which measured the recurrence rate of the event-responsive pulses and, upon that rate exceeding a predetermined threshold, turns on the camera to film the subject under observation; in like manner, upon subsequent play back, the recurrence rate of the reproduced pulses may be measured and, if it exceeds a related threshold, may turn on a projector for the reproduction of corresponding sections of the film.

The system herein described may be used, for example, to determine the rate of pulsebeat of human beings during various activities, such as bicycling, shoveling coal, or undergoing other physical stress (e.g. during childbirth), and the reference signals may in fact be derived from a concomitant activity, such as the act of pedaling in the case of a cyclist. I have found that a very effective transducer for converting the human pulsebeat into electric pulses is in the form of an attachment to the ear, with a lamp carried thereon to transluminate the earlobe and a photoresistor positioned to receive the transmitted radiation. A radio transmitter and receiver may be inserted between the pulse pickup and the recorder, or the typewriter, to eliminate the need for a physical linkup between the subject and the evaluation equipment.

The invention will be described in greater detail with reference to the accompanying drawing in which;

FIG. 1 is a somewhat diagrammatic view of the transmitter stage of a recording system embodying this invention;

FIG. 2 is a similar view of a receiving and charting station associated with the transmitter stage of FIG. 1;

FIG. 4 is a more detailed circuit diagram of the receiver and other elements of FIG. 2; and FIG. 5 is a graph illustrating a typical recording sheet showing a set of markings representative of the number and cadence of a recurrent event as charted by the system of FIG. 1—4.

Figure 3:
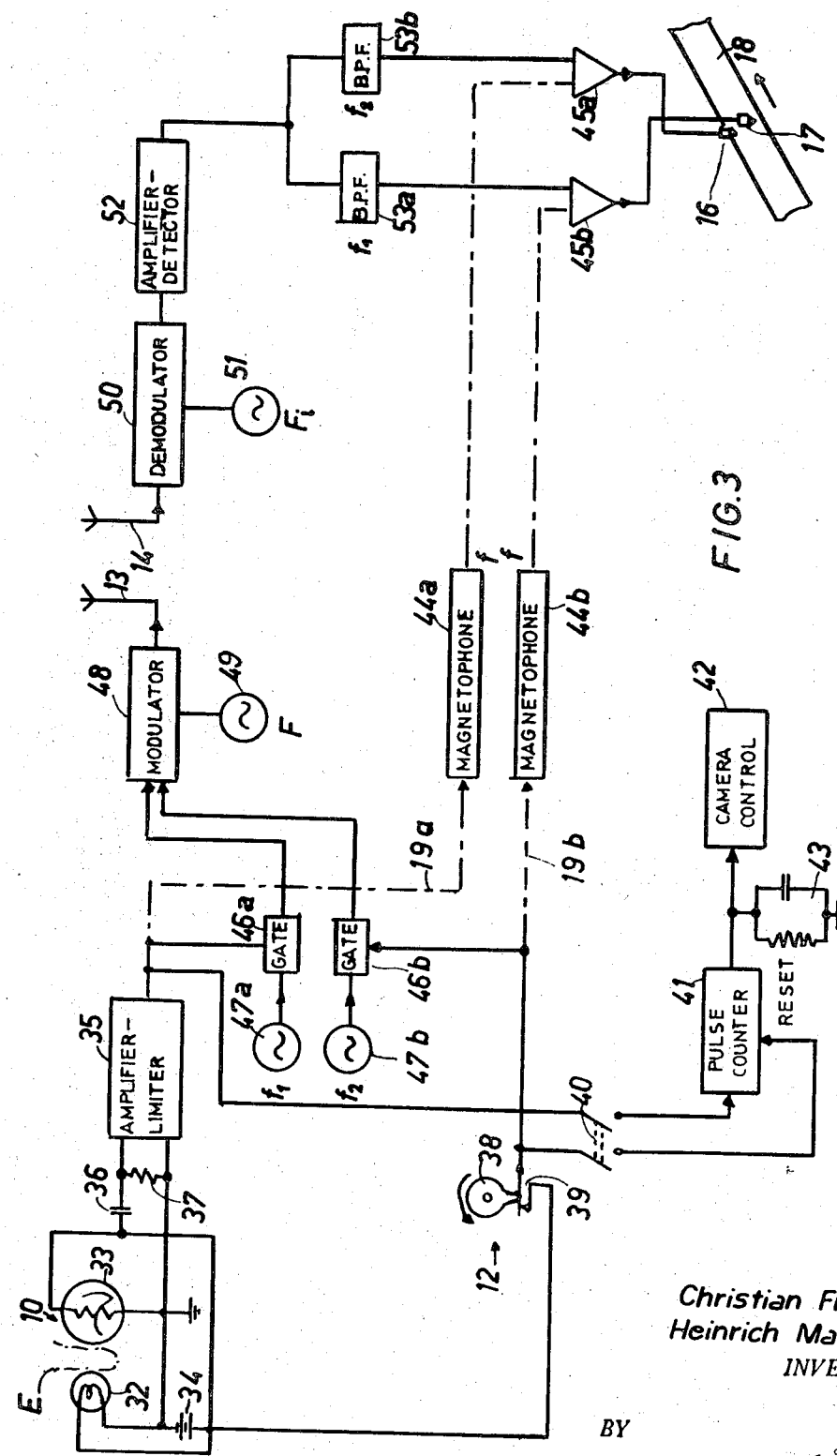
FIG. 3 is a more detailed circuit diagram of the transmitter and other elements of FIG. 1.

In FIG. 1, I have shown a human test subject S on a bicycle B, the subject S carrying a pulse generator 10 in the form of an earclip. A transmitter 11 receives the output of generator 10 and of a second generator 12 which is mechanically driven from the pedals of the bicycle so as to emit a pulse upon, say, every downtread by either leg of the subject S. The pulsebeat of the subject, converted into electric pulses by the generator 10, has a much higher cadence than the output of generator 12. Transmitter 11, strapped to the body of the cyclist by his suspenders, has an antenna 13 operating, say, on a carrier frequency of about 27.5 megacycles.

A receiving antenna 14 intercepts the waves from transmitting antenna 13 and feeds them to a receiver 15 whose audio frequency output is delivered to a pair of recording heads 16, 17 cooperating with parallel magnetic tracks on a continuously moving tape 18. At 19 I have indicated a direct connection from transmitter 11 to receiver 15, bypassing the high frequency stages of these two circuits, by way of a control circuit 20 which also serves to trigger a motion picture camera 21 trained upon the subject S. Control circuit 20 is so arranged, as more fully described hereinafter with reference to FIG. 3, that camera 21 is turned on only when the pulse rate of the cyclist (in absolute terms or as related to the pulse rate from generator 12) exceeds a certain threshold. Connection 19 may be a transmission line adapted to be plugged into a transmitter 11 and the receiver 15 when the subject S remains on the spot, e.g. with the bicycle B lifted off the ground or rolling on a moving belt or turntable.

In FIG. 2, I have shown the magnetic tape 18 during playback, possibly on the same apparatus (not further illustrated) that served for the recording in FIG. 1. Two reading heads 22, 23 pick up the signals stored on the tape 18 and deliver then to a control circuit 24 for the operation of a conventional electric typewriter 25. As diagrammatically indicated, typewriter 25 has a first switch 26 for the control of a character key, a second switch 27 for the return of its carriage and the line feed, and a third switch 28 for shifting the ink ribbon of the typewriter to change colors (e.g., from red to blue and vice versa). These three switches are controlled, in a manner described hereinafter with reference to FIG. 4, from circuit 24 which also has means for varying the speed of a motor 29, driving the tape 18, and for operating a projector 30 serving to reproduce the developed film from camera 21 on a screen 31. Projector 30 goes into action whenever the control circuit 24 determines that the rate of pulses picked up by the head 32 exceeds the same threshold which determined the operation of camera 21 in FIG. 1, or a multiple of that threshold if the speed of motor 29 is increased so that the speed of tape 18 during playback is a multiple of its speed during recording.

Reference will now be made to FIG. 3 for a more detailed description of the elements 10—24 shown in FIG. 1. Pulse generator 10 comprises a lamp 32 and a photoresistor 33 positioned on on opposite sides of the earlobe E of the test subject S (FIG. 1). An energy source for this generator has been shown diagrammatically as a battery 34. The photoresistor 33, whose resistance may vary between 10 megohms in the dark and 700 ohms in the illuminated state, is connected to the input of an amplifier-limiter 35 by way of a coupling network which includes a capacitor 36 and a leakage resistor 37. Network 36, 37 may have a time constant approximately equal to the average human pulse rate, thereby reducing the sensitivity of the amplifier to other periodic influences such as, for example, the breathing rate of the subject.

Unit 35 may be a multistage transistor amplifier arranged to be overdriven by any significant changes in the resistance of impedance 33, regardless of the absolute magnitude of that resistance, as passed by the condenser 36. Since the opacity of earlobe E and therefore the degree of illumination of photoresistor 33 changes rhythmically with each pulsebeat, the output of amplifier-limiter 35 is a train of rectangular pulses of constant amplitude independent of the thickness of the earlobe and other physical peculiarities of subject S. In view of the sensitivity of the photoresistor, the luminous intensity of lamp 32 may be low.

Pulse generator 12 is shown in FIG. 3 to comprise a rotatable cam 38 which closes a pair of contacts 39 at a rate determined by the pedaling speed of the cyclist, e.g. at the beginning of the downstroke of each pedal. The reference signals thus produced by contacts 39 can be fed, via a manual switch 40, to a reset input of a pulse counter 41 which receives at its main input the pulsebeat-responsive pulses from limiter 35. When the count of circuit 41 exceeds a predetermined threshold, indicating for example a strenuous effort on the part of the subject S (e.g. during actual or simulated uphill pedaling), counter 41 energizes a control circuit 42 to trigger the camera 21 of FIG. 1; an intergrating network 43 maintains continuity of camera operation between successive counting periods.

The connection 19 of FIG. 1 has been indicated also in FIG. 3 by dot–dash lines and includes a pair of conductors 19a, 19b extending from the outputs of limiter 35 and contacts 39, respectively, to a pair of magnetophones 44a, 44b producing an audio frequency $f$, e.g. of 900 c.p.s. This audio frequency is delivered via extensions of conductors 19a, 19b to a pair of amplifiers 45a, 45b respectively energizing the recording heads 16, 17 associated with tape 18. When the direct line 19 is not in use, the pulses from limiter 36 and contacts 39 respectively open a pair of gates 46a, 46b for the passage of different audio frequencies $f_1$ and $f_2$ generated by a pair of oscillators 47a, 47b. These two audio frequencies are applied to a modulator 48 receiving a carrier frequency receiving a carrier frequency F from an oscillator 49. The amplitude-modulated carrier energizes transmitting antenna 13. From receiving antenna 14, this radiation is delivered to a demodulator 50 which also receives an intermediate frequency $F_i$ from a local oscillator 51. The output of the demodulator 50 is supplied to a detector 52 which reproduces the two audio frequencies $f_1$ and $f_2$ passed by respective band-pass filters 53a and 53b for delivery to amplifiers 45a and 45b. The recording of the outputs of these amplifiers on tape 18 is identical in both instances.

Reference will now be made to FIG. 4 which shows details of elements 22—28 illustrated in FIG. 2. Reading heads 22 and 23 work into the inputs of respective amplifiers 54a, 54b, each having a pair of resonant circuits 55a, 56a and 55b, 56b selectively energizable via respective arms of a multilevel switch 57. Resonant circuits 55a, 55b are tuned to audio frequencies $f_1$ and $f_2$, respectively, whereas resonant circuits 56a, 56b are tuned to frequencies $2f_1$ and $2f_2$, respectively. Another arm of switch 57 controls a speed-regulating circuit 58 which determines the velocity of tape 18 by varying the operating rate of motor 29 (FIG. 2). In its illustrated left-hand position, switch 57 causes the motor 29 to be driven at a rate $n$, with energization of resonant circuits 55a and 55b, whereas in its alternate position the motor will operate at a speed $2n$ while circuits 56a and 56b are energized. It will be apparent that a switch of this type may be used to change the tape speed and the resonant frequencies by a factor $k$ which may be any constant greater than 1, preferably an integer.

Amplifier 54a, when energized with alternating current of frequency $f_1$ or $2f_1$ (depending on the setting of switch 57), operates a relay 59a whose armature then closes a circuit for the energization of the key-actuating switch 26 of typewriter 25 (FIG. 2). This circuit includes a contact of another manual switch 60 which in its illustrated position directly connects the live terminal of a voltage source, shown as a battery 61, to switch 26 by way of a diode 62. In the alternate position of switch 60, battery voltage is applied to a pulse suppresser 63 in the form of a stepping switch comprising a ratchet 64, a stepping pawl 65 controlled by a solenoid 66, a retaining pawl 67 controlled by a solenoid 68, and a wiper 69 engaging a set of bank contacts 70. Solenoid 66 is shown connected in series with wiper 69 and, in response to the first seven pulses from relay 59a, successively advances the wiper over its bank contacts 70 without generating an output. After the seventh release of solenoid 66, wiper 69 stands on the final bank contact 70' which is connected by way of a diode 71 to the input of key-actuating switch 26. In this position of the wiper, any further pulse from relay 59a thus actuates the typewriter key associated with switch 26. Solenoid 68 is connected, in the aforementioned alternate position of manual switch 60, to battery voltage through an armature of another relay 59b which responds to energization of amplifier 54b. Relay 59b, when operated, also actuates the line-feed switch 27 of the typewriter. Furthermore, a sequencer in the form of a unidirectional stepping switch 72 has a wiper 73 cooperating with twelve bank contacts 74', 74". The six bank contacts 74' are connected to the winding and armature of a relay 75 so as to energize the color-changing switch 28 whenever the wiper stands on one of these contacts; the six bank contacts 74" are left unconnected. Thus, in the example shown, the typewriter will print with one color (e.g. blue) during a period of six reference pulse intervals and in another color (e.g. red) during another like period.

An alternate source of reference signals, with constant timing, has been shown at 76 and can be made effective by the reversal of a manual switch 77 which disconnects the amplifier 54b from reading head 23 and connects it instead via a fourth arm of switch 57 to the cathode of either of two photocells 78', 78" forming part of timer 76. This timer further includes a light source 79 positioned to illuminate the photocells 78', 78" through associated light gates 80', 80" shown as a pair of disks with three and six radial slots, respectively. Upon rotation of disks 80' and 80" at constant speed by a motor not shown, e.g. at a rate of 2 r.p.m. photocell 78' will be pulsed every 10 seconds whereas photocell 78" will be pulsed every 5 seconds. Six consecutive actuations of relay 59b, therefore, will represent a recording interval of 1 minute if tape 18 is driven, during recordal, by a motor operating at speed $n$. Stepping switch 72, accordingly, measures alternate 1-minute periods during which the ribbon of the typewriter 25 is held in either of its two color positions.

A pulse counter 81 is connected to be stepped and reset, in the closed position of a manual switch 82, from the outputs of relays 59a and 59b, respectively, in a manner analogous to that described in connection with pulse counter 41 of FIG. 3. Counter 81 works through an integrating network 83 into a circuit 84 controlling the projector 30 of FIG. 2 in the aforedescribed manner.

In FIG. 5 I have shown the markings 85 produced on the sheet 86 (FIG. 2) by the system heretofore described, with switch 77 of FIG. 4 assumed to be in its alternate position to activate the timer 76. The chart shows along the horizontal abscissa the number N of occurrences (e.g. pulse beats) and along its vertical ordinate the elapsing time $t$. The number $N_0$ of pulses skipped by the suppresser 63 of FIG. 4, here 7, represents the invariable minimum which will occur during the time interval (*e.g.* 10 seconds) represented by each horizontal line. It will be noted that a switchover from red to blue and vice versa occurs at 1-minute intervals, *i.e.* after every sixth line. Furthermore, the manually traced envelope 87 of the pattern of markings 85 represents the variation of pulse rate with time and can thus be used in lieu of any time chart conventionally produced by much more elaborate equipment.

Naturally, the system disclosed herein can be modified in various ways, *e.g.* by using several parallel sound tracks on the tape 18 to control a plurality of typewriters 25 for the purpose of comparing the simultaneous performances of several subjects. These and other variations, readily apparent to persons skilled in the art, are intended to be embraced within the spirit and scope of my invention as defined in the appended claims.

We claim:

1. A system for recording and cadence of occurrences of a recurring event relative to a recurring reference signal, comprising an electric typewriter with a carriage and character keys, first switch means coupled with said typewriter for actuating a character key thereof, second switch means coupled with said typewriter for performing a carriage-return and line-feeding operation, first pulse-generating means responsive to an occurrence of the event to be recorded, second pulse-generating means for producing the recurring reference signal, first circuit means connecting said first source to said first switch means, and second circuit means connecting said second pulse-generating means to said second switch means.

2. A system as defined in claim 1 wherein said first circuit means includes a pulse counter adapted to produce a switch-actuating output only in response to pulses exceeding a predetermined minimum number, said counter being connected to said second circuit means for resetting in response to each occurrence of said reference signal.

3. A system as defined in claim 1 wherein said typewriter further includes third switch means for changing colors, said second circuit means including a sequencer for shifting said third switch means into alternate operating positions thereof upon a predetermined number of occurrences of said reference signal.

4. A system as defined in claim 1 wherein said first pulse-generating means includes an electromagnetic tape recorder having reading means for picking up said pulses from a tape placed thereon.

5. A system as defined in claim 4 wherein said reading means has an audiofrequency output, said first circuit means including an amplifier provided with a resonant amplifier tuned to the frequency of said output, further comprising switchover means for changing the speed of said tape by a factor $k$, $k$ being an integer greater than 1, and for concurrently varying the resonant frequency of said amplifier by the same factor $k$.

6. A system as defined in claim 1 wherein said event is the pulsebeat of a living subject, further comprising camera means for photographing said subject, and rate-measuring means controlled by said first circuit means for actuating said camera means upon the cadence of said event exceeding a predetermined threshold.

7. A system as defined in claim 1 wherein said event is the pulsebeat of a human being, and said first pulse-generating means comprises a source of transluminating radiation and a photoresistive receiver for said radiation attachable to the earlobe of said human being.

8. A system as defined in claim 7 wherein said first pulse-generating means further comprises a capacitor in series with the output of said receiver and amplitude-limiting means connected for energization via said capacitor.

9. A system as defined in claim 8 wherein said capacitor is part of a coupling network having a time constant on the order of the mean frequency of the human pulsebeat.